United States Patent [19]

Inumochi

[11] Patent Number: 4,939,603
[45] Date of Patent: Jul. 3, 1990

[54] MAGNETIC HEAD SLIDER HAVING A CONVEX TAPER SURFACE WITH THE CURVATURE FACING A MAGNETIC MEDIUM

[75] Inventor: Mitsuo Inumochi, Itami, Japan

[73] Assignee: Mitsubishi Denki Kabushiki Kaisha, Tokyo, Japan

[21] Appl. No.: 357,615

[22] Filed: May 25, 1989

Related U.S. Application Data

[63] Continuation of Ser. No. 116,209, Nov. 3, 1987, abandoned.

[30] Foreign Application Priority Data

Nov. 6, 1986 [JP] Japan ................................. 61-264451
Aug. 28, 1987 [JP] Japan ................................. 62-214501

[51] Int. Cl.$^5$ .............................................. G11B 5/60
[52] U.S. Cl. ....................................... 360/103; 360/129
[58] Field of Search ............... 360/102, 103, 104, 122, 360/129

[56] References Cited

U.S. PATENT DOCUMENTS 3,327,916 6/1967 Weidenhammer et al. ......... 360/102
3,573,769 4/1971 Flora .............................. 360/102 X
3,582,917 6/1971 Hertrich et al. .................... 360/102
3,922,776 12/1975 Alger et al. ..................... 360/103 X

FOREIGN PATENT DOCUMENTS 0129336 12/1984 European Pat. Off. ............ 360/103
0127310 3/1979 Japan ................................ 360/103
0028650 6/1983 Japan .
0054071 3/1984 Japan ................................ 360/104
60-44265 3/1985 Japan .
0243878 12/1985 Japan ................................ 360/103

Primary Examiner—Robert S. Tupper
Assistant Examiner—Andrew L. Sniezek
Attorney, Agent, or Firm—Fleit, Jacobson, Cohn, Price, Holman & Stern

[57] ABSTRACT

In a magnetic head slider having a air-bearing surface facing a magnetic medium, and a taper surface inclined with respect to the air-bearing surface, the above-mentioned taper surface is shaped as a convex surface with the curvature facing the magnetic medium.

5 Claims, 4 Drawing Sheets

MAGNETIC HEAD SLIDER HAVING A CONVEX TAPER SURFACE WITH THE CURVATURE FACING A MAGNETIC MEDIUM

This application is a continuation of application Ser. No. 116,209, filed Nov. 3, 1987, now abandoned.

BACKGROUND OF THE INVENTION

The present invention relates to a magnetic head slider of a magnetic disk apparatus.

FIG. 8 is a perspective view of a known magnetic head slider which is disclosed in Japanese Patent Publication No. 28,650/1983. FIG. 9 is a side view illustrating the slider in a flying state, and FIG. 10 is a plan view of the same slider. In the attached drawings, reference numeral 1 designates a magnetic head slider, 2 is a air-bearing surface, 3 is an intake taper surface, 4 designates a magnetic head, 5 is a magnetic medium, 6 is a supporting spring, and 7 is an adhesive substance.

The device operates in the following manner: when magnetic medium 5 is immobile, magnetic head slider 1 is held in contact with magnetic medium 5 by supporting spring 6. When, however, magnetic medium 5 begins to move in the direction indicated by the arrow, an air flow, which is generated with this movement, comes into contact with intake taper surface 3, flows over air-bearing surface 2, and thus maintains head slider 1 in a flying state.

Because a ridge line, which is formed between intake taper surface 3 and air-bearing surface 2 of the known magnetic head slider, is oriented almost perpendicular to the direction of movement of the magnetic medium, it easily collects an adhesive build-up which may flow out suddenly from the air-bearing surface, damage the surface of magnetic medium 5, and even crash the head.

SUMMARY OF THE INVENTION

It is an object of the present invention to eliminate the above disadvantages and to provide a magnetic head slider which is free of accumulation of an adhesive build-up on the taper surface and thus protects the head from crashing.

According to the invention, there is provided a magnetic head slider having a air-bearing surface facing a magnetic medium, and a taper surface located on the air-intake side for an air flow generated with a movement of said magnetic medium, wherein said taper surface is a convex surface with the curvature facing said magnetic medium.

Because in the slider of the invention, the taper surface is formed as a curved surface facing the magnetic medium (preferably with imaginary line of intersection between the taper surface and the air-bearing surface formed as a curve with the curvature facing the direction of the incoming air flow), the air flow, which is generated when the magnetic medium is running, has smooth entrance to the air-bearing surface. Even though particles of dirt, which may be formed in a disk apparatus, are accumulated on the taper surface, these particles will be removed by the incoming air flow either to the air-bearing surfaces or to the right or left side thereof prior to their accumulation and solidification into large aggregates. This is because the taper surface has a convex curvilinear shape, and because the portion in the vicinity of the above-mentioned imaginary line of intersection is curved toward the incoming air flow.

DETAILED DESCRIPTION OF THE PREFERRED EMBODIMENT

Figure 1:
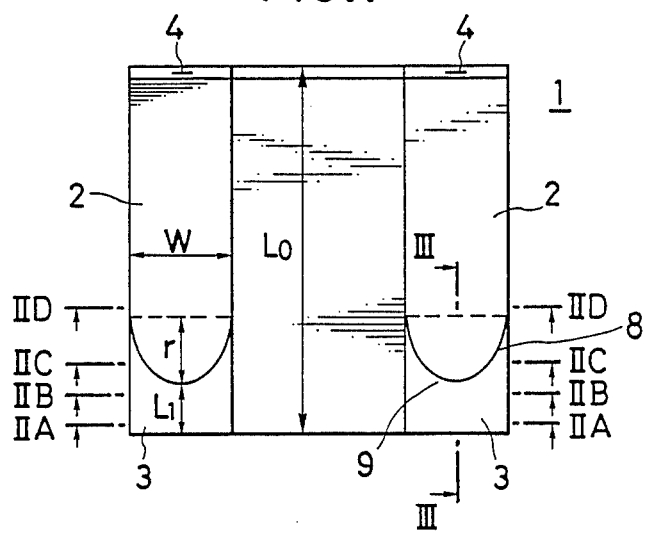
FIG. 1 is a plan view of a magnetic head slider in accordance with one embodiment of the present invention.
Figure 2A:
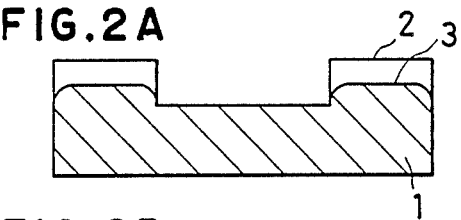
FIGS. 2A, 2B, 2C and 2D are respective sectional views along lines IIA—IIA, IIB—IIB, IIC—IIC and IID—IID of FIG. 1.
Figure 2B:
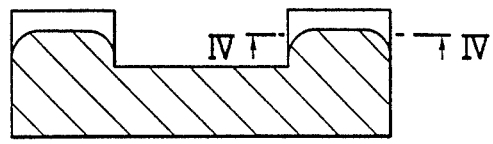
Figure 2C:
Figure 2D:

An embodiment of the present invention will be now described with reference to the accompanying drawings. In FIG. 1, which is a plan view of a magnetic head slider of the invention, reference numeral 1 designates a magnetic head slider, 2 is a air-bearing surface, and 3 is a taper surface which is shaped as a projection facing a magnetic medium. Reference numeral 4 designates a magnetic head, and 8 is an imaginary ridge formed by a line of intersection between air-bearing surface 2 and taper surface 3. This imaginary ridge 8 is shaped as a projection facing the air intake direction. Portion 9 in the vicinity of this ridge 8 is formed by merging air-bearing surface 2 and taper surface 3. $L_0$ shows the length of the slider, $L_1$ is a distance from the air-intake end of the slider to the crest (top) of convex imaginary ridge 8, w is the width of air-bearing surface 2, and r is a distance from the crest of convex imaginary ridge 8 to the bottom of the above-mentioned imaginary ridge. FIG. 2A is a sectional view along line IIA—IIA of FIG. 1; FIG. 2B is a sectional view along line IIB—IIB, FIG. 2C is a sectional view along line IIC—IIC, and FIG. 2D is a sectional view along line IID—IID of FIG. 1, FIG. 3 is a sectional view along line III—III of FIG. 1, and FIG. 4 is a sectional view along line IV—IV of FIG. 2.

Figure 3:
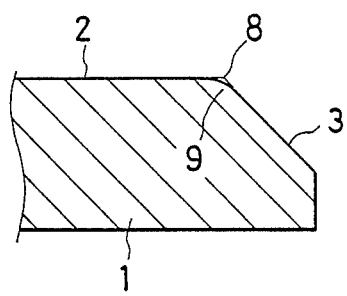
FIG. 3 is a sectional view along line III—III of FIG. 1.
Figure 4:
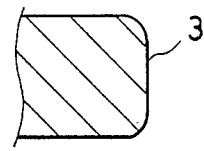
FIG. 4 is a sectional view along line IV—IV of FIG. 2B.

As shown in FIG. 3, taper surface 3 is inclined with respect to air-bearing surface 2. Furthermore, as shown in FIGS. 1 and 4, the ridge 8 which is in fact an imaginary line and cannot be seen on a real slider and a front ridge of a cross section of taper surface 3 in a direction substantially parallel to air-bearing surface 2 are shaped as a projection facing the incoming air flow, respectively. As shown in FIG. 3, portion 9 formed by merging between air-bearing surface 2 and taper surface 3 is smoothly curved. Thus, taper surface 3 has a circular or parabolic profile which is symmetrical on the left and right sides thereof. In other words, taper surface 3 is shaped as a curved surface with the curvature facing the magnetic medium.

When taper surface 3 has the configuration described above, even though dust or dirt particles can be formed under contact start/stop conditions (hereinafter referred to as CSS) or during disk running with a steady speed, accumulation of these particles on the air-bearing surface and the taper surface will be reduced to the minimum because of the specific shape (circular or parabolic profile) of imaginary line 8 of intersection. Prior to solidification or aggregation into a large adhesive build-up, these fine particles are smoothly transferred from taper surface 3 to portion 9 in the vicinity of ridge 8 and then flowed out either to air-bearing surface 2 or to left or right sides thereof. Thus accumulation of the adhesive build-up is prevented by taper surface 3.

Figure 5:
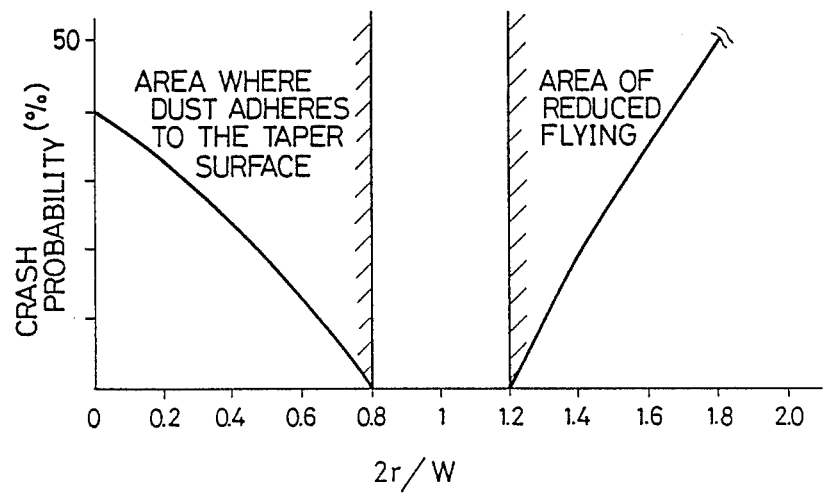
FIG. 5 is a characteristic diagram which shows crash probability with respect to a convex profile.

Flying characteristics and probability of crash by the build-up were studied with various shapes of the convex profile of imaginary line 8 of the slider. FIG. 5 is a characteristic diagram which represents crash probability corresponding to the convex configuration of imaginary line 8. In this graph, probability (%) is plotted on an ordinate axis, while an abscissa axis shows an index of curvature in terms of $2r/w$. As follows from this drawing, crash probability becomes equal to zero when the index of curvature satisfies the following condition: $0.8 < 2r/w < 1.2$. The next study related to pitch angle of the slider at the CSS moment with various ratios of taper length $L_1$ to slider length $L_0$. The results show that when the $L_1/L_0$ ratio is smaller than 1/20, at the CSS moment small particles of dust and dirt collide with the slider, by which the balance of the slider is lost and the slider pitches forward. Therefore, these particles can penetrate to the disc and damage the latter. If, on the other hand, the above-mentioned ratio exceeds ⅛, flying height is reduced, and pitch angle of the slider as a whole is decreased as well. Therefore, it is recommended that the $L_1/L_0$ ratio of the taper length to the slider length be within the range of 1/20 to ⅛.

Figure 6A:
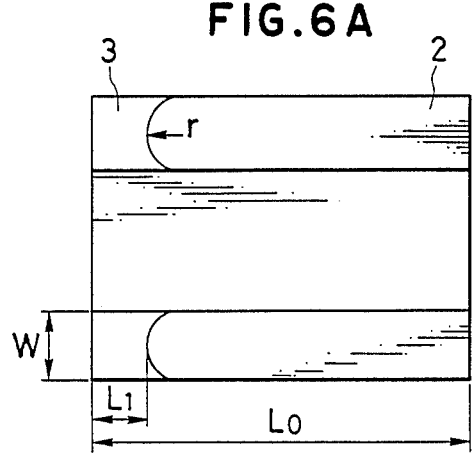
FIGS. 6A and 6B are plan views which illustrate configurations of sliders used for the CSS test.
Figure 6B:
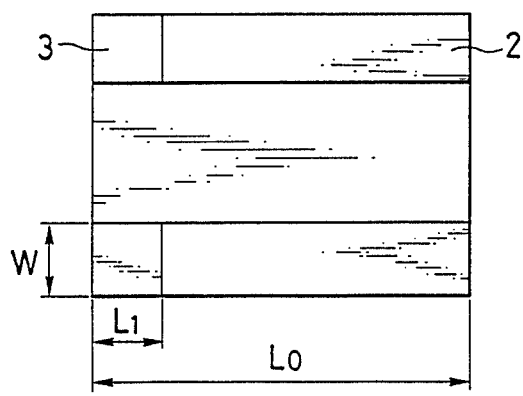

For comparison of crash behavior between the conventional slider and the embodiment of the present invention, the sliders were subjected to CSS test in the environment with the degree of cleanness corresponding to Class $10 \times 10^4$. Sliders used in the experiment are shown in FIGS. 6 where FIG. 6A illustrates the slider of the present invention, and FIG. 6B shows the conventional slider, both being shown in plan views. The sliders had the following dimensions: $L_0 = 4$ mm, $L_1 = 0.34$ mm, $L_1' = 0.37$ mm (i.e., a distance in the conventional slider from the air-incoming end to the line of intersection between the air-bearing surface and taper surface), $w = 0.48$ mm, and $r = 0.24$ mm. In the CSS test, samples (testpieces) of the head sliders according to the invention and samples of the conventional head sliders were subjected to repeated CSSs (contact start-and-stops) up to 20,000 times, during which damages on the disks and the head sliders were detected by use of an acoustic emission sensor. The output of the acoustic senser becomes high when the damages are detected. With 40% of the samples of the conventional head sliders, damages were detected before the 20,000 repeated CSSs. In contrast, no damages were detected with any of the samples of the head sliders according to the invention. Thus this test also confirms that the slider of the invention provides an excellent anti-crash effect.

Figure 7:
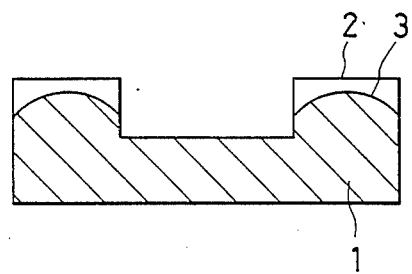
FIG. 7 is a sectional view of a slider corresponding to another embodiment of the present invention.
Figure 8:
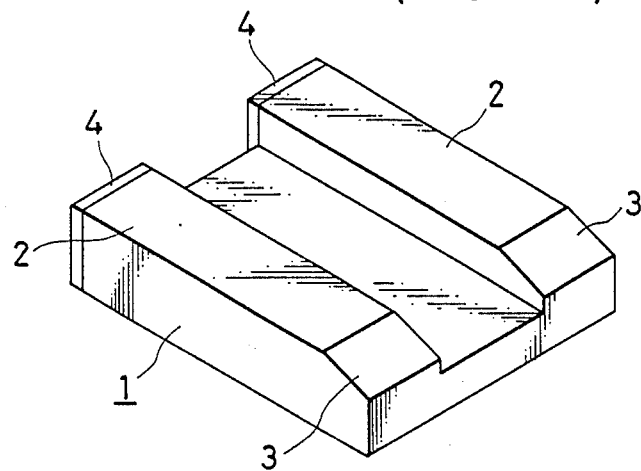
FIG. 8 is a perspective view of a conventional head slider.
Figure 9:
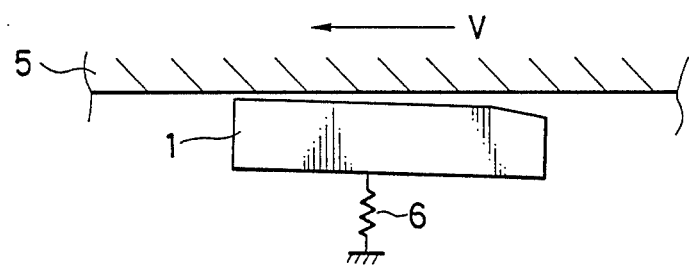
FIG. 9 is a side view of the conventional slider in a flying state.
Figure 10:
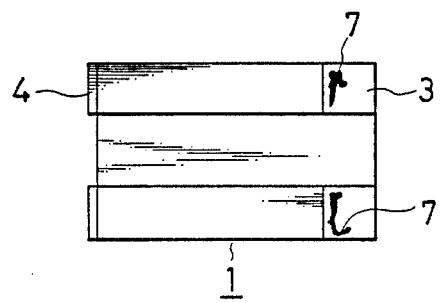
FIG. 10 is a plan view which shows the pattern of accumulation of dirt on the conventional slider.

FIG. 7 shows another embodiment of the present invention. The slider of this embodiment differs from the one of FIG. 2 in having a greater radius of curvature on taper surface 3 in a cross section perpendicular to the direction of movement of the magnetic medium.

According to the invention, in a magnetic head slider having a convex curvilinear profile on the taper surface which is located on the intake side of the air flow generated when the magnetic medium is running, because the curvature of this profile faces the above-mentioned magnetic medium, particles of dirt do not stick to the taper surface and therefore do not damage the magnetic medium and do not cause head crash.

What is claimed is:

1. A magnetic head slider for positioning a magnetic head relative to a rotating magnetic medium including first and second parallel guiding members having first and second air bearing surfaces, respectively, said first and second air bearing surfaces having a predetermined width and being substantially flat across said width in a first region of said guiding members so as to maintain said slider in a flying state when said medium is rotated with respect to said slider, and first and second tapered surfaces located on a second, air-intake region of each of said guiding members for cutting through an air flow generated with a movement of said magnetic medium, wherein each of said tapered surfaces is a convex surface with a curvature facing said magnetic medium, wherein an imaginary line connecting between each of said air-bearing surfaces and each of said tapered surfaces on said first and second guiding members, respectively, and extending across each of said air-intake regions of said first and second guiding members to respective side edges of said air-intake regions of said first and second guiding members, is outwardly convexed with respect to the direction of the incoming air flow, and a merging portion between each of said tapered surfaces and each of said air-bearing surfaces, being a smooth curve, and wherein each of said tapered surfaces on each of said air-intake regions of said first and second guiding members are symmetrical with respect to the side edges of said first and second guiding members in said air-intake regions thereof.

2. A magnetic head slider according to claim 1, which satisfies the following condition: $0.8 < 2r/w < 1.2$ where w is a width of each of the air-bearing surfaces and r is a radius of said smooth curve of said merging portion.

3. A magnetic head slider according to claim 1, which satisfies the following condition: $1/20 < L_1/L_0 < ⅛$, where $L_0$ is a length of the slider, and $L_1$ is a distance from an interface of said merging portion with each of said tapered surfaces to front edge surfaces of each of said tapered surfaces.

4. A magnetic head slider for positioning a magnetic head relative to a rotating magnetic medium including first and second parallel guiding members having first and second air bearing surfaces, respectively, said first and second air bearing surfaces having a predetermined width and being substantially flat across said width in a first region of said guiding members so as to maintain said slider in a flying state when said medium is rotated with respect to said slider, and first and second tapered surfaces located on a second, air-intake region of each of said guiding members for cutting through an air flow generated with a movement of said magnetic medium, wherein each of said tapered surfaces is a convex surface with a curvature facing said magnetic medium, wherein an imaginary line connecting between each of said air-bearing surfaces and each of said tapered surfaces on said first and second guiding members, respectively, and extending across each of said air-intake regions of said first and second guiding members to respective side edges of said air-intake regions of said first and second guiding members, is outwardly convexed with respect to the direction of the incoming air flow and symmetrical with respect to the side edges of said first and second guiding members in said air-intake regions thereof, and a merging portion between each of said tapered surfaces and each of said air-bearing surfaces being a smooth curve, and wherein the following condition is satisfied: $0.8 < 2r/w < 1.2$ where $w$ is a width of each of the air-bearing surfaces and $r$ is a radius of said smooth curve of said merging portion.

5. A magnetic head slider for positioning a magnetic head relative to a rotating magnetic medium including first and second parallel guiding members having first and second air bearing surfaces, respectively, said first and second air bearing surfaces having a predetermined width and being substantially flat across said width in a first region of said guiding members so as to maintain said slider in a flying state when said medium is rotated with respect to said slider, and first and second tapered surfaces located on a second air-intake region of each of said guiding members for cutting through an air flow generated with a movement of said magnetic medium, wherein each of said tapered surfaces is a convex surface with a curvature facing said magnetic medium, wherein an imaginary line connecting between each of said air-bearing surfaces and each of said tapered surfaces on said first and second guiding members, respectively, and extending across each of said air-intake regions of said first and second guiding members to respective side edges of said air-intake regions of said first and second guiding members, is outwardly convexed with respect to the direction of the incoming air flow and symmetrical with respect to the side edges of said first and second guiding members in said air-intake regions thereof, and a merging portion between each of said tapered surfaces and each of said air-bearing surfaces being a smooth curve, and wherein the following condition is satisfied: $1/20 < L_1/L_0 < \frac{1}{3}$, where $L_0$ is a length between leading and trailing ends of the slider, and $L_1$ is a distance from an interface of said merging portion with each of said tapered surfaces to the leading end of the slider.

* * * * *